US010731525B2

(12) United States Patent
Brückner et al.

(10) Patent No.: US 10,731,525 B2
(45) Date of Patent: Aug. 4, 2020

(54) METHOD FOR FLEXIBLE OPERATION OF A POWER PLANT

(71) Applicant: Siemens Aktiengesellschaft, Munich (DE)

(72) Inventors: Jan Brückner, Uttenreuth (DE); Frank Thomas, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 14/782,607

(22) PCT Filed: Mar. 26, 2014

(86) PCT No.: PCT/EP2014/056028
§ 371 (c)(1),
(2) Date: Oct. 6, 2015

(87) PCT Pub. No.: WO2014/166739
PCT Pub. Date: Oct. 16, 2014

(65) Prior Publication Data
US 2016/0040549 A1    Feb. 11, 2016

(30) Foreign Application Priority Data

Apr. 10, 2013  (EP) ..................................... 13163024

(51) Int. Cl.
| F01K 3/00 | (2006.01) |
| F01L 13/00 | (2006.01) |
| F01K 23/10 | (2006.01) |
| F02C 3/00 | (2006.01) |
| F02G 5/02 | (2006.01) |

(52) U.S. Cl.
CPC ............. *F01L 13/00* (2013.01); *F01K 23/105* (2013.01); *F02C 3/00* (2013.01); *F02G 5/02* (2013.01)

(58) Field of Classification Search
CPC .......... F01S 13/00; F01K 23/105; F02C 3/00; F02G 5/02
See application file for complete search history.

(56) References Cited

U.S. PATENT DOCUMENTS

| 4,578,944 A * | 4/1986 | Martens ................ F01K 23/105 |
| | | 122/7 B |
| 2003/0131601 A1 | 7/2003 | Baxter |
| 2010/0288210 A1* | 11/2010 | Bruckner ................ F22B 37/38 |
| | | 122/451.1 |
| 2012/0260667 A1 | 10/2012 | Chillar et al. |

FOREIGN PATENT DOCUMENTS

| DE | 19734862 A1 * | 2/1999 | ............ F22B 1/1815 |
| WO | 2008107916 A1 | 9/2008 | |

* cited by examiner

*Primary Examiner* — Matthew T Largi
(74) *Attorney, Agent, or Firm* — Beusse Wolter Sanks & Maire

(57) ABSTRACT

A method for flexible operation of a power plant having a recovery steam generator having heat exchanger stages for generating live steam and/or reheater steam for a steam turbine from an exhaust flow of a gas turbine, wherein auxiliary firing is arranged in a flue gas channel of the recovery steam generator in the region of the heat exchanger stages. In order to regulate the live steam and/or the reheater steam, at least one injection cooling device is brought online directly upon using the auxiliary firing.

5 Claims, 1 Drawing Sheet

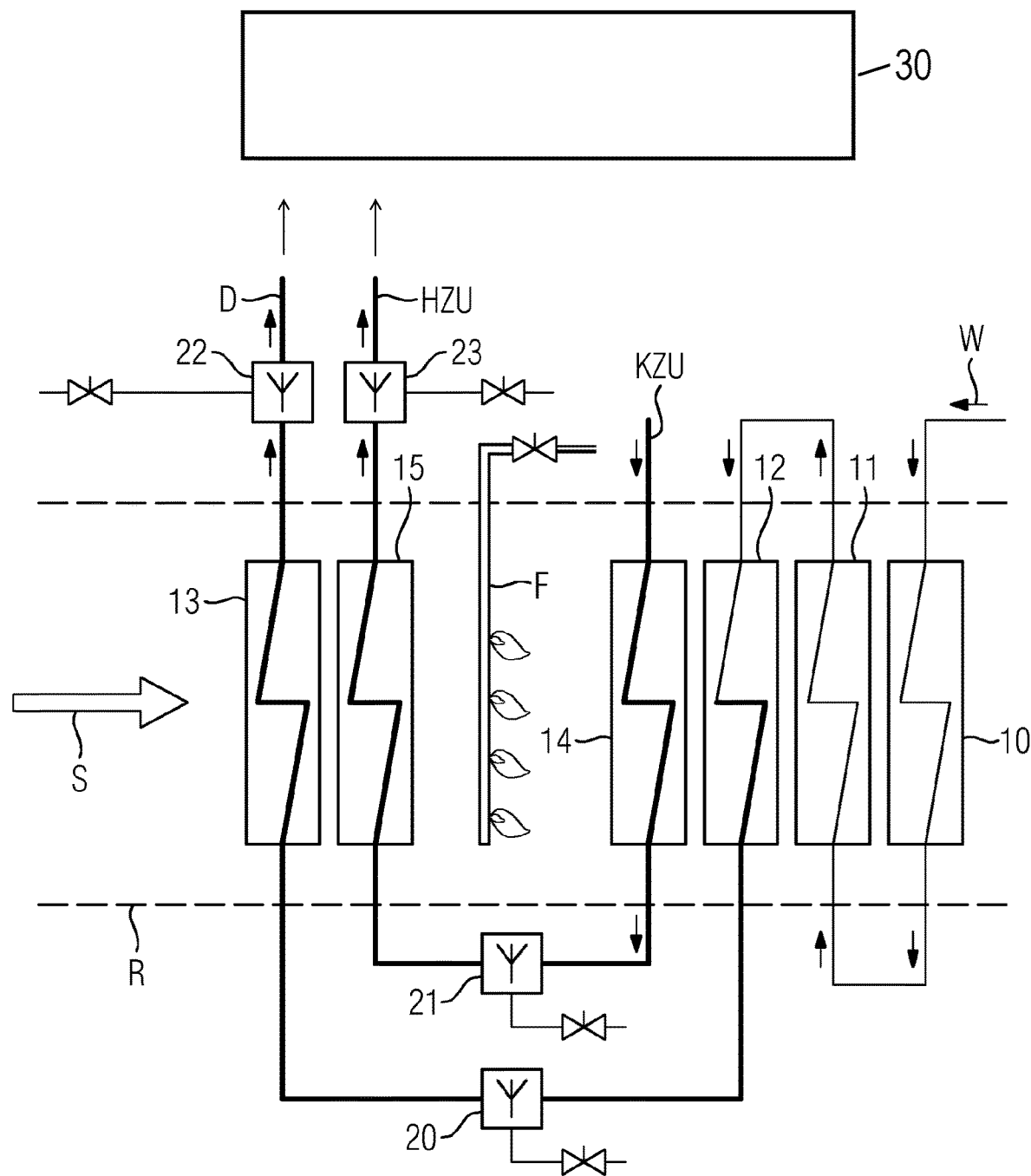

METHOD FOR FLEXIBLE OPERATION OF A POWER PLANT

CROSS REFERENCE TO RELATED APPLICATIONS

This application is the US National Stage of International Application No. PCT/EP2014/056028 filed Mar. 26, 2014, and claims the benefit thereof. The International Application claims the benefit of European Application No. EP13163024 filed Apr. 10, 2013. All of the applications are incorporated by reference herein in their entirety.

FIELD OF INVENTION

The invention relates to a method for flexible operation of a power plant.

BACKGROUND OF INVENTION

Nowadays, modern power plants are required not only to be highly efficient but also to have the greatest possible flexibility of operation. This includes, in addition to short start-up times and high load-change speeds, for example also the possibility of equalizing frequency disturbances in the grid. Depending on country-specific requirement profiles for grids and the associated remuneration models, it can therefore be expedient, specifically in the case of gas and steam power plants, in the peak load range, to as quickly as possible make available to the grid additional power by means of the water-steam circuit using an auxiliary firing, also when the gas turbine is already operated at full load.

Using an auxiliary firing, which is generally arranged within the flue gas duct of a waste heat steam generator in the region of the heat exchanger stages which serve as superheaters or intermediate superheaters, increases the heat power transferred to the water-steam circuit, such that the quantity of steam generated and, finally, also the mechanical power released by means of the steam turbine are increased. Thus, the temperatures of the fresh steam and of the intermediate superheater steam increase when the auxiliary firing is switched on. In the reverse case, these both drop again when the auxiliary firing is switched off. The rate of change of the fresh steam temperature or of the intermediate superheater steam temperature is however subject to fatigue-related limits, with regard to the steam turbine as a thick-walled component. While it is still possible, when switching on the auxiliary firing, to effectively counter an impermissibly rapid and large increase in steam temperatures by using an associated injection cooling device, in the reverse case a required reduction in the injection quantity is not infinitely possible. At the latest at the moment at which the injection cooling device is finally closed, the desired temperature of fresh steam or intermediate superheater steam can no longer be maintained by means of a further reduction in the auxiliary firing power. Both steam temperatures begin to slide. Their rate of change is then directly coupled to the rate of change of the auxiliary firing power and can thus, in an unfavourable case, exceed the maximum permissible rates of change of the steam turbine.

SUMMARY OF INVENTION

The invention therefore has an object of providing a method which makes it possible, even in the case of a reduction in load or in the case of the complete shut-off of the auxiliary firing, to keep the rate of change of both the fresh steam temperature and the intermediate superheater steam temperature to within permissible limits.

This object is achieved with the method for flexible operation of a power plant which comprises a waste heat steam generator with heat exchanger stages for generating, using an exhaust gas flow of a gas turbine, fresh steam and/or intermediate superheater steam for a steam turbine, wherein an auxiliary firing is arranged in a flue gas duct of the waste heat steam generator, in the region of the heat exchanger stages, and wherein for regulating the fresh steam and/or the intermediate superheater steam, at least one injection cooling device is brought on-line directly upon using the auxiliary firing. It is thus possible, independently of an actual temperature of the fresh steam or intermediate superheater steam, for injection cooling devices to be brought on-line directly (that is to say without a noteworthy time delay and thus approximately simultaneously) with the use of the auxiliary firing. Thus, both the fresh steam temperature and the intermediate superheater steam temperature can be kept as constant as possible over the entire load range of the switched-on auxiliary firing.

In particular, in that context, when using the auxiliary firing, a setpoint temperature for the fresh steam or for the hot intermediate superheater steam should be set exactly to the temperatures of the fresh steam or of the intermediate superheater steam actually measured prior to switching on the auxiliary firing. For safety's sake, it is also possible to set a small temperature difference of for example plus 1 K. In these circumstances, the injection cooling device begins operation as soon as the auxiliary firing is switched on, such that as the auxiliary firing power increases the injected quantity also continuously increases. Since the two setpoint temperatures are now chosen such that the injection cooler device comes on-line as soon as the auxiliary firing is switched on, it is also possible to ensure, in the reverse case for a load reduction, that it remains possible to regulate the steam temperatures until the point at which the auxiliary firing is switched off, and thus to keep these constant.

Optionally, it would also be possible to control the steam end temperatures exclusively with the aid of end injection cooling devices. This has the advantage that both the temperature of the fresh steam and that of the hot intermediate superheater steam can be kept constant with even greater control performance, since exclusive regulation by means of the end injection cooling device(s) makes it possible to react substantially more quickly to any variations in steam temperature.

If high rates of change in auxiliary firing load are required on account of high grid demand, these can now be satisfied with the aid of the method according to the invention while observing safe operation of the steam turbine. By coupling the setpoint steam temperatures to the actually measured steam temperatures when switching on the auxiliary firing, the injection cooling devices are active over the entire load range of the auxiliary firing, which means that both steam temperatures can be kept constant over the entire load range of the auxiliary firing, both for increasing load and for decreasing load. Thus, the auxiliary firing operation results in no additional reduction in the service life of the steam turbine, which would not be ensured in the case of a fresh steam temperature or intermediate superheater steam temperature sliding with the auxiliary firing. In that case, the maximum rates of change of auxiliary firing load would be limited by the steam turbine, such that in certain circumstances it would be impossible to fulfil the requirements of the grid, which would substantially compromise the flexibility of use of the plant. In fact, the plant-side loss of efficiency as a consequence of the increased injection quantities in auxiliary firing operation appears to be tolerable in principle, since, in the case of plants with activated auxiliary firing, the efficiency plays more of a subordinate role.

It is in addition possible, with the particular embodiments of the method according to aspects of the invention, that an optimum can be achieved also from an efficiency point of view. In that context, the step of predefining the setpoint steam temperature is coupled to suitable plant parameters, such that on one hand it is possible to achieve the maximum possible steam temperatures (minimum injection requirement) but at the same time it is also ensured that the injections remain in operation over the entire load range of the auxiliary firing, which means that even in the event of a decrease in load there are always enough injection reserves.

In essence, the method according to aspects of the invention thus ensures high plant flexibility with, at the same time, material-protecting use of the steam turbine.

BRIEF DESCRIPTION OF THE DRAWINGS

The FIGURE shows a schematical view an exemplary embodiment of the present invention.

DETAILED DESCRIPTION OF INVENTION

The invention will now be explained, by way of example, with reference to a drawing. What is shown is a flue gas duct R in which the hot exhaust gas flow S is fed to a gas turbine (not shown in more detail). In the flue gas duct R itself, there are arranged multiple heat exchanger stages 10 to 15, by means of which heat energy from the hot exhaust gas S, flowing past, is transferred to a water-steam mixture as working medium for a downstream steam turbine (not shown in more detail).

In the example shown here, multiple heat exchanger stages 10 to 13 for the actual water-steam circuit are connected in series, such that the feed water W introduced into the first heat exchanger stage 10 is increasingly heated by this first heat exchanger stage as pre-heater and by the subsequent evaporator and superheater and is thus converted into steam D. In addition, in the present exemplary embodiment, there is provided an additional intermediate superheater circuit consisting of two series-connected heat exchanger stages 14 and 15, for intermediate superheating. Cold intermediate superheater steam KZU from the high-pressure section of the steam turbine is thus reheated and fed back to the steam turbine 30 as hot intermediate superheater steam HZU. In the region of the heat exchanger stages 10 to 15, there is also arranged an auxiliary firing F.

It is now provided, according to the invention, that, for regulating the fresh steam D and/or the intermediate superheater steam HZU, at least one of the injection cooling devices 20 to 23, arranged between and/or downstream of the heat exchanger stages 10 to 15, is brought on-line directly upon using the auxiliary firing F. The control devices for the auxiliary firing F and the injection cooling devices 20 to 23, required for regulating the fresh steam or the intermediate superheater steam, are indicated here schematically by means of corresponding controllable valves in the respective supply lines. These allow the auxiliary firing F to be switched on, in that fuel is supplied and ignited in a regulated manner, and the respective injection cooling devices 20 to 23 to be brought on-line, in that spraying water is supplied in a regulated manner to the injection cooling devices.

The invention claimed is:

1. A method for flexible operation of a power plant comprising a waste heat steam generator comprising heat exchanger stages for generating, using an exhaust gas flow of a gas turbine, fresh steam or intermediate superheater steam for a steam turbine, wherein an auxiliary firing arrangement comprising a fuel control valve for supplying ignitable fuel in a regulated manner configured to generate auxiliary heat is arranged in a flue gas duct of the waste heat steam generator, between the heat exchanger stages, comprising:

for regulating the fresh steam or the intermediate superheater steam, initiating injection via an injection cooling device comprising a control valve for spraying water in a regulated manner and initiating firing of the auxiliary firing arrangement at the same time, wherein with respect to a direction of flow of the exhaust gas flow in the flue gas duct a final stage of heating of the fresh steam or the intermediate superheater steam is disposed farthest upstream in the exhaust gas flow, and wherein the injection cooling device is configured to inject into the fresh steam or the intermediate superheater steam that has exited the final stage of heating and is enroute to the steam turbine, and when using the auxiliary firing arrangement, setting a setpoint temperature for the fresh steam or for the intermediate superheater steam to a temperature of the fresh steam or of the intermediate superheater steam actually measured prior to switching on the auxiliary firing arrangement.

2. The method as claimed in claim 1, further comprising regulating the fresh steam or the intermediate superheater steam exclusively with the injection cooling device; wherein the injection cooling device is arranged downstream of the final stage of heating.

3. A method, comprising:

operating a power plant, wherein the power plant comprises: a first circuit comprising first steam; a flue gas duct configured to receive an exhaust gas flow of a gas turbine; an auxiliary firing arrangement comprising a fuel control valve for supplying ignitable fuel in a regulated manner in the flue gas duct; first circuit heat exchangers disposed in the flue gas duct and configured to transfer heat from the exhaust gas flow and heat from the auxiliary firing arrangement to the first steam in the first circuit; and a first circuit injection cooling device comprising a control valve for spraying water in a regulated manner, the method comprising:

activating firing of the auxiliary firing arrangement; and activating injection via the first circuit injection cooling device at the same time firing of the auxiliary firing arrangement is activated, wherein with respect to a direction of flow of the exhaust gas flow in the flue gas duct a final stage first circuit heat exchanger of the first circuit heat exchangers is disposed farthest upstream in the exhaust gas flow and is a final stage of heating of the first steam in the first circuit in the flue gas duct, and wherein the first circuit injection cooling device is configured to regulate a temperature of the first steam in the first circuit by injecting water into the first steam that has exited the final stage first circuit heat exchanger and is enroute to a steam turbine.

4. The method of claim 3, further comprising:

measuring a temperature of the first steam prior to activating the auxiliary firing arrangement; and operating the auxiliary firing arrangement using a setpoint temperature for the first steam that is within one degree Kelvin to the temperature of the first steam prior to activating the auxiliary firing arrangement, effective to ensure that a temperature of the first steam over an entire load range of the auxiliary firing arrangement is within the one degree Kelvin of the temperature of the first steam prior to activating the auxiliary firing arrangement.

5. The method of claim 3, wherein the power plant further comprises an intermediate superheater circuit comprising intermediate superheater steam; intermediate superheater circuit heat exchangers disposed in the flue gas duct and configured to transfer heat from the exhaust gas flow and heat from the auxiliary firing arrangement to the intermediate superheater steam in the intermediate superheater circuit; and an intermediate superheater circuit injection cooling device comprising a control valve for spraying water in a regulated manner, with respect to the direction of flow of the exhaust gas flow in the flue gas duct a final stage intermediate superheater circuit heat exchanger of the intermediate superheater circuit heat exchangers is disposed farthest upstream in the exhaust gas flow and is a final stage of heating of the intermediate superheater steam in the intermediate superheater circuit in the flue gas duct, and wherein the intermediate superheater circuit injection cooling device is configured to cool the intermediate superheater circuit steam in the intermediate superheater circuit that has exited the final stage intermediate superheater circuit heat exchanger and is enroute to the steam turbine.

\* \* \* \* \*